Patented Aug. 25, 1925.

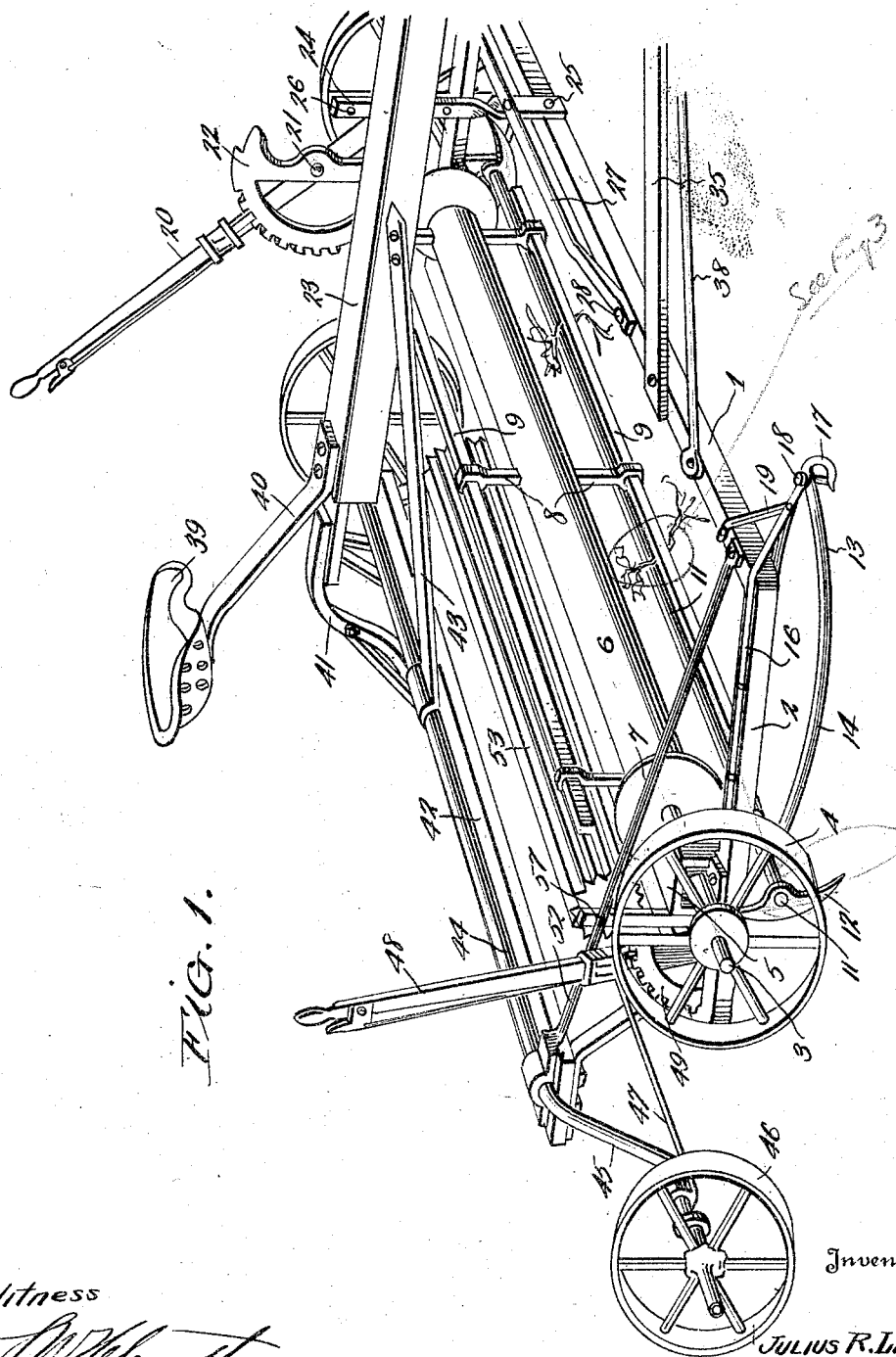

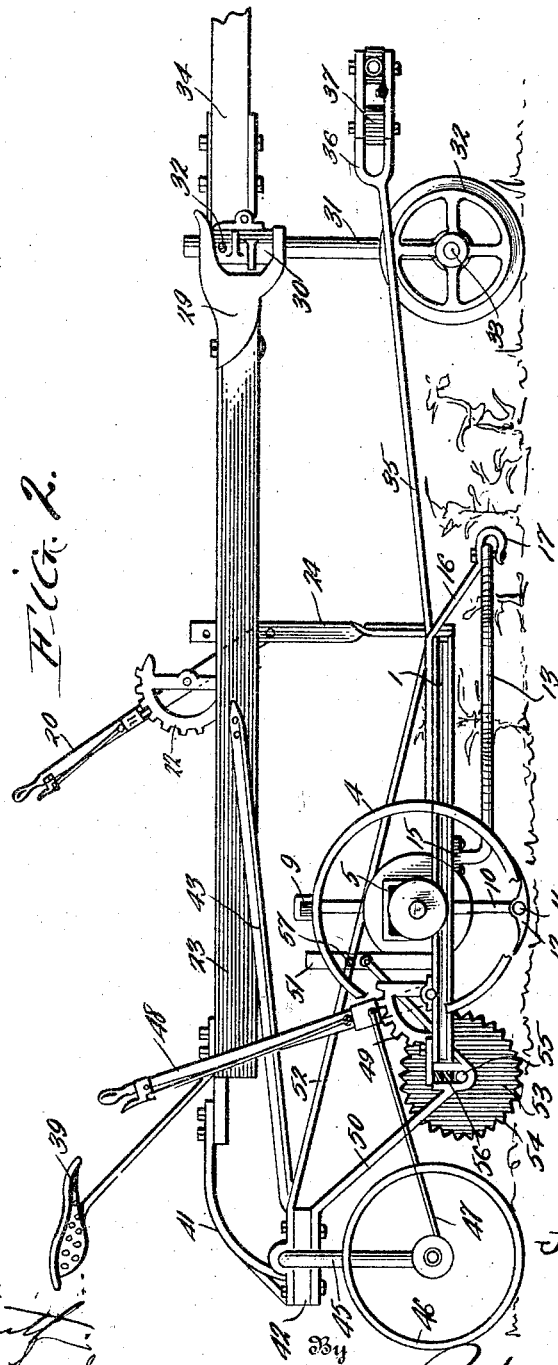

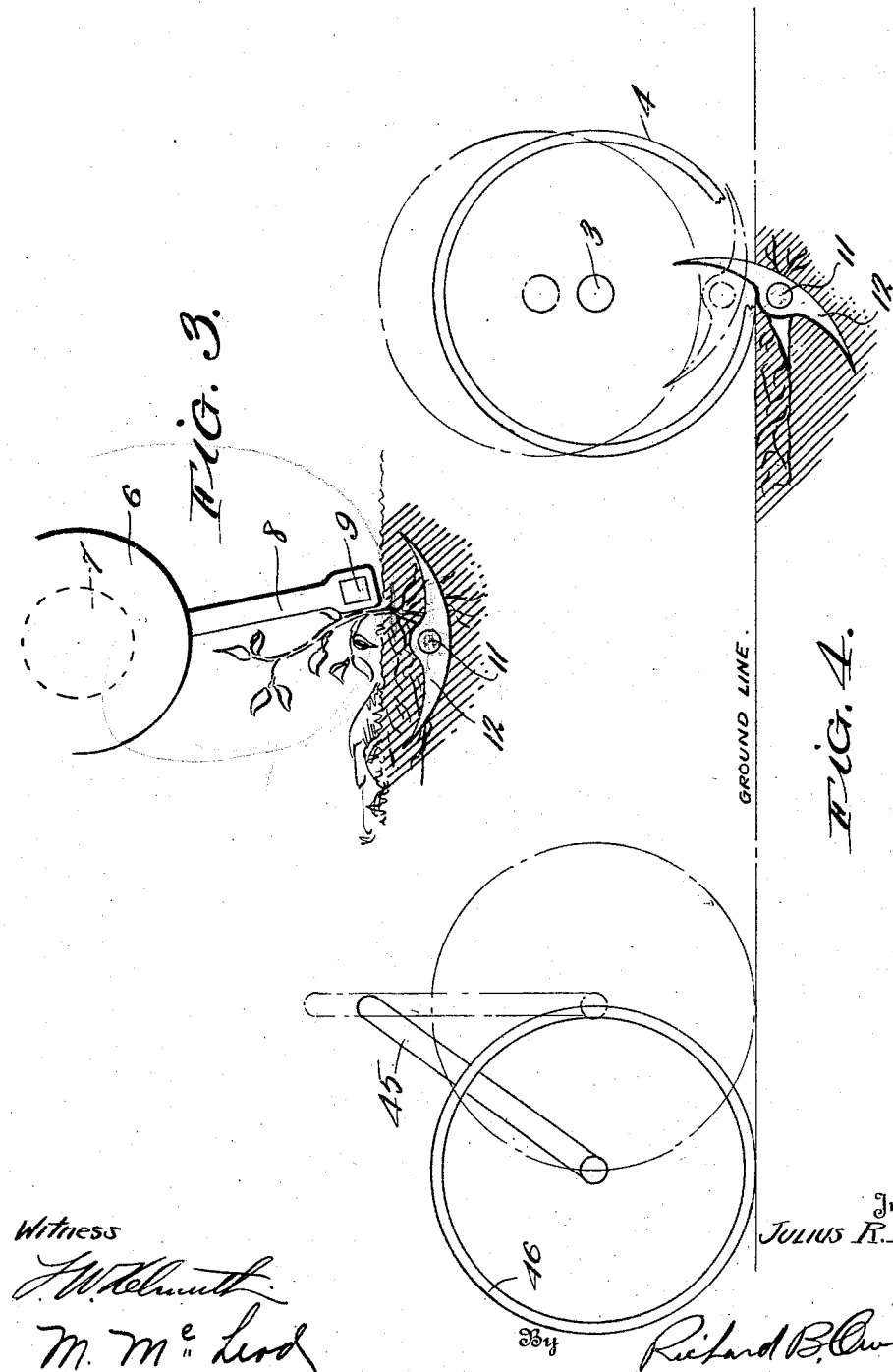

1,550,971

UNITED STATES PATENT OFFICE.

JULIUS R. LARSON, OF WRENTHAM, ALBERTA, CANADA.

WEEDER.

Application filed July 27, 1922. Serial No. 578,021.

*To all whom it may concern:*

Be it known that I, JULIUS R. LARSON, a subject of King of Great Britain, residing at Wrentham, in the Province of Alberta and Dominion of Canada, have invented certain new and useful Improvements in a Weeder, of which the following is a specification.

This invention relates to new and useful improvements in weeders or machines for exterminating weeds, the primary object of the invention being to provide a rotary weed pulling device operating in conjunction with a root loosening device whereby the rotary weeding device will "whip" the weeds to extract them from the ground.

Another important object of the invention resides in the provision of a revolving root loosening element which is adapted to travel under the surface of the ground to run against the roots for loosening the same prior to their extraction.

A further object of the invention is to provide the weeder with weed gathering means which will act to guide the weeds into the path of movement of the rotary weed pulling device.

A still further object of the invention resides in the provision of a weed crushing and cutting roller situated in the rear of the weeding device so as to cut the weeds extracted by the latter and thereby obviating any possibility of the weeds taking root again.

Another object of the invention resides in the provision of a device of the above character having a weeding device carried by the main frame which can be raised and lowered at will so as to either place the weeding device into operation, or retain the same spaced from the ground so as to render the same inoperative.

A further object of the invention is to provide a frame for the weeder, and means for guiding weeds into the path of movement of the weeding device and also means for raising or lowering the frame so as to adjust the weed gathering devices to the proper elevation to properly engage with the weeds to be exterminated.

Other objects and advantages of the invention will become apparent during the course of the following description.

In the accompanying drawings forming a part of the description and wherein like numerals are employed to designate like parts throughout the several views, Figure 1 is a perspective view of a machine embodying the invention, Figure 2 is a side elevation of the machine showing the weeding device in an inoperative position, Figure 3 is an enlarged detail elevation of the weeding mechanism, and Figure 4 is a diagrammatic view illustrating the manner in which the weeding mechanism is placed in operation.

Referring now more specifically to the drawings, wherein for the purpose of illustration is shown the preferred embodiment of the invention, the numeral 1 designates the main frame of the weeder, and which in the present instance assumes the form of a rectangular frame, the sides 2 of which support axle spindles 3 and to which are secured traction wheels 4. These traction wheels are situated outside of the main frame, and the axle spindles 3 extend through box housings 5 carried by the sides of the main frame so that the wheels will have both vertical and horizontal play. The axle spindles 3 are extended entirely through the box housings at opposite sides of the frame and are secured in the end of a rotary drum 6 which forms a part of the weeding mechanism. Since the axle spindles 3 are in reality carried by the drum 6 it will be obvious that the latter as well as traction wheels 4 have movement to meet inequalities in the land being cultivated. To each end of the drum 6 is secured a disk 7 which is substantially larger in diameter than the drum and are designed principally to keep the weeds within the path of the weeding mechanism.

Secured to opposite sides of the drum and arranged in longitudinal alignment are a plurality of outwardly extending or radiating arms 8, and each longitudinally aligned set of these arms are adapted to carry an elongated bar 9 and retain the same in spaced parallel relationship to the drum 6. These bars 9 extend the full length of the drum 6 and being parallel thereto are arranged transversely of the direction in which the machine is drawn.

Arranged beneath the axis of the rotary weeder 6 and journaled in a pair of supporting arms 10 depending from the sides of the frame, is a root loosening rod 11 which is arranged slightly below the lower side of the traction wheels 4. When the weeding mechanism is not in operation, this root loosening rod which is rotatable in the supporting arms 10, is carried above the surface of the ground as well as the traction wheels 4 to be hereinafter described. To each end of the root loosening rod 11 is keyed a pick-shaped element 12 which consists of an arcuated member having its ends pointed so that they will readily penetrate the surface of the ground which is being cultivated. From Fig. 1 it will be noted that these elements are arranged at approximately right angles to one another, so that in the operation of the device, one of the members will be engaged with the ground to impart rotary movement to the root loosening rod 11 while the co-acting element 12 is recovering from the ground to assume a position to penetrate the same when the other element extracts itself therefrom.

A weed gathering device 13 is extended from each side of the main frame and each gathering device consists of a pair of oppositely bowed arms 14 arranged in horizontal spaced relationship and fixed to the under side of the main frame near the axle spindle 3 as best seen in Fig. 2. The forward ends of these bowed arms converge and meet in advance of the main frame 1 and are supported by a downwardly inclined end of a brace 16 carried by the main frame. The forward free end of this brace is formed into a rearwardly opening hook 17 to which the forward end of the bowed arms 14 are fastened by means of a pin or bolt 18. As a further brace for each weed guide 13 I provide a strut 19 which is secured at its upper end to the front of the main frame and at its lower end to the depending portion of brace 16. The inner bowed arm of each weed gathering device 13 is curved and arranged so as to gather in the weeds from both sides as the machine is drawn along and guides the weeds into the path of movement of the rotary weed pulling bars 9.

In order that the weed gathering devices 13 can be elevated to properly guide weeds of varying heights into the path of movement of the rotary weeding mechanism, I provide means for raising and lowering the front of the main frame 1. These means consist of a pawl and ratchet lever 20 fulcrumed as at 21 to an upright of a rack segment 22 which is secured to a stub tongue 23 forming a part of the draft means for the machine. The lower end of the ratchet lever 20 is pivotally connected to the upper end of a bar 24, the lower end of which depends below the stub tongue and is twisted so that a flat side of the bar may be secured to the vertical front face of the main frame as at 25. The upper end of the bar 24 is equipped with a plurality of spaced apertures 26 any of which may be associated with the lower end of the ratchet lever 20 so that the movement of the frame can be adjusted at will. A truss rod 27 has its medial portion secured to the lower end of the bar 24, while opposite ends of the truss rod are bent downwardly to be secured as at 28 to the front of the main frame adjacent the sides thereof so that whenever it is desired to elevate the front of the main frame 1, the ratchet lever 20 is moved downwardly and rearwardly of the machine so as to cause the bar 24 to move upwardly and impart a corresponding movement to the front of the main frame 1 which pivots on the axle spindles 3 so that the weed gathering devices 13 will be raised to properly engage and guide weeds into the weeding mechanism.

The forward end of the stub tongue 23 is provided with a forked casting 29, the arms of which are arranged in vertical spaced relation to receive therebetween a sleeve 30 through which extends the upper end of a standard 31 which carries a pair of ground engaging wheels 32. The standard 31 of course extends through the arms of the forked casting 29, and the sleeve 30 being secured to the standard by means of a set screw 32' or other suitable fastening means, it will be seen that the forward end of the stop tongue will be supported. The lower end of the standard 31 is provided with a casting through which the axle 33 of the ground engaging wheels extend, so that opposite ends of the axle are arranged at opposite sides of the casting. To the sleeve 30 is secured draft tongue 34 whereby any suitable draft means can be used in drawing the weeder through a field. A draft bar 35 is also provided on each side of the stub tongue 23 and each draft bar is secured at its rear end to its respective side of the main frame 1 while the forward end of the bar is forked as at 36 for the purpose of being secured to a whiffle-tree carrying bar 37. The draft bar is braced by means of connecting rods 38 fastened at their rear ends to the main frame 1 and at their forward ends to the forward end of the draft bar 35.

A seat 39 for the operator is positioned at the rear of the stub tongue 23 and is resiliently supported by a standard 40 the lower end of which is attached to the rear end of the stub tongue 23. A brace 41 secured to the rear end of the stub tongue has its rear end curved downwardly to be secured to an auxiliary frame 42 which extends transversely of the machine in rear of the weed picking device and traction wheels 4. The brace 43 is attached at its forward end to each side of the stub tongue in advance of the seat while the rear end of each of said braces is connected to the auxiliary frame 42 as shown in Fig. 1. An axle 44 is journaled on the frame 42 and extends longitudinally thereof as shown, while the ends 45 of the axle are bent downwardly to form crank ends, or in other words an arched axle. A ground engaging wheel 46 is mounted on each crank axle and the latter is moved forwardly and rearwardly of the machine by means of a reach rod 47 connected to one crank axle by its rear end and at its forward end to a ratchet lever 48 pivotally connected at its lower end to the rear of the main frame 1 at one side thereof. A rack segment 49 is secured to the main frame adjacent the pivot of the ratchet lever 48 for co-operation with a spring pressed pawl carried by the ratchet lever 48 and operated in the conventional manner. The frame 42 is connected to the main frame 1 by a substantially V-shaped member 50 arranged at each end of the beam 42 and having one arm secured thereto while its other arm is attached to a vertical standard 51 rising from the main frame 1. A truss rod 52 at each side of the frame is also provided for connecting the beam 42 to the main frame, and each truss rod 52 has its rear end connected to the beam as shown, and its forward end to the front of the main frame 1.

A weed destroying and crushing roller 53 is arranged transversely of the machine in back of the weed pulling device and the outer surface of the roller is provided with a plurality of pointed ribs 54 as shown which are designed to cut the pulled weeds into fragments. A pintle 55 is secured to each end of the roller and extends outwardly thereof to be mounted in the crotch of its adjacent V-shaped connecting member as shown in advantage in Fig. 2. A vertical slot is provided in the crotch of each connecting member 50 for the reception of the pintles 55 of the weed crushing roller, and a coil spring 56 is positioned in each slot to bear upon the pintle received therein so that the crushing roller will be held in engagement with the ground. The medial portion of each truss rod 52 is secured as at 57 to the upper end of its respective upright 51 so that the latter will be substantially straight and capable of assisting in retaining the weed crushing roller in proper position.

In operation, and when the machine is being drawn to the field to be cultivated the ratchet lever 48 is arranged in a position to cause the reach rod 47 to hold the crank ends 45 of the axle 44 in a substantially vertical position so that the traction wheels 4 as well as the root loosening rod and its elements 12 are spaced above the surface of the ground. When the machine reaches the field to be cultivated, the operator moves the ratchet lever 48 rearwardly to cause the crank axle 45 to move rearwardly of the machine to the position shown in full lines in Fig. 4 so that the main frame and traction wheels 4 will be lowered and the latter will engage the ground. As the root loosening rod 11 is arranged slightly below the relative bottoms of the traction wheels it will be seen that the rod 11 will be plunged into the earth which must have been recently plowed or be in a soft fallow condition. As the machine is drawn forwardly, weeds engaging the weed gathering devices 13 will be guided into the path of movement of the rotary bars 9 while others will be guided to one side of the machine by the relative outer bowed arms 14 of the weed gathering devices. As the machine moves forwardly, the root loosening rod 11 is drawn beneath the surface of the ground at a depth of about two inches and is caused to rotate by means of the ground engaging elements 12 alternately engaging and digging into the ground as explained hereinbefore. It will be seen that this rotating rod 11 will be drawn into engagement with the roots of the weeds as shown in the diagrammatic view in Fig. 3 and will cause the roots to be loosened so that the weed pulling bars 9 will whip against the stalks of the weeds adjacent the points where they enter the ground and lift them out of the ground by means of a whipping action so that roots and all will be extracted. The faster the machine is pulled along, the faster the drum 6 will rotate thereby carrying the weeding bars 9 rapidly through the weeds, whipping weeds out of the ground as they move along. The weeds which are extracted are thrown in back of the drum 6 on the surface of the ground to be crushed by the ribbed roller 53 so that there will be little possibility of the weeds ever taking root again.

The weed gathering devices 13 arranged at the sides of the machine are arranged at various elevations to properly engage weeds of various heights by means of adjusting the ratchet lever 20 in a manner well understood. Should it be desired to lift the root loosening rod out of the ground and disengage the traction wheels 4 therefrom, the ratchet lever 48 should be moved forwardly to cause the crank axles 45 to be arranged in approximately vertical position as shown in dotted lines in Fig. 4 so that the traction wheels 4 will be held in spaced relation to the ground to render the weeding mechanism inoperative.

The foregoing description and accompanying drawings have reference to what might be considered the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim is:—

1. In a weeder, the combination with a rotary rod adapted to pass through the ground to loosen the roots of weeds, of a rotary weed pulling mechanism arranged above the surface of the ground and including a plurality of weed engaging members adapted to pull the weeds from the ground.

2. In a weeder, the combination with a rod adapted to pass through the ground and loosen the roots of weeds, elements carried by the rod for imparting rotary movement thereto; of a rotary weed pulling mechanism arranged above the surface of the ground and adapted to extract the loosened weeds therefrom.

3. In a weeder, the combination with a rotatable rod arranged transversely of the weeder and adapted to pass through the ground to loosen the roots of vegetation, and means for facilitating rotation of said rod of a rotary weed pulling mechanism arranged above the surface of the ground and including a plurality of bars arranged transversely of the weeder and adapted to cooperate with the rod to extract the vegetation from the ground.

4. In a weeder, a rod adapted to pass through the ground and loosen the roots of weeds, and elements carried by the rod adapted to engage and enter the ground for imparting rotary movement thereto, said elements embodying pick-shaped members secured on the rod, in staggered relation so as to alternately engage and enter the ground.

5. In a weeder, the combination with a rod adapted to pass through the ground and loosen the roots of weeds, and elements carried by the rod adapted for imparting rotary movement thereto, of a rotary weed pulling mechanism arranged above the surface of the ground, and adapted to extract the loosened weeds therefrom, said weed pulling mechanism being vertically yieldable relative to the rod.

6. In a weeder, the combination with a rod adapted to pass through the ground and loosen the roots of weeds, and elements carried by the rod adapted for imparting rotary movement thereto, of a rotary weed pulling mechanism arranged above the surface of the ground, and adapted to extract the loosened weeds therefrom, said weed pulling mechanism being horizontally yieldable relative to the rod.

7. In a weeder, the combination with a rod adapted to pass through the ground and loosen the roots of weeds, and elements carried by the rod adapted for imparting rotary movement thereto, of a rotary weed pulling mechanism arranged above the surface of the ground, and adapted to extract the loosened weeds therefrom, said weed pulling mechanism being vertically and horizontally yieldable relative to the rod.

In testimony whereof I affix my signature.

JULIUS R. LARSON.